UNITED STATES PATENT OFFICE.

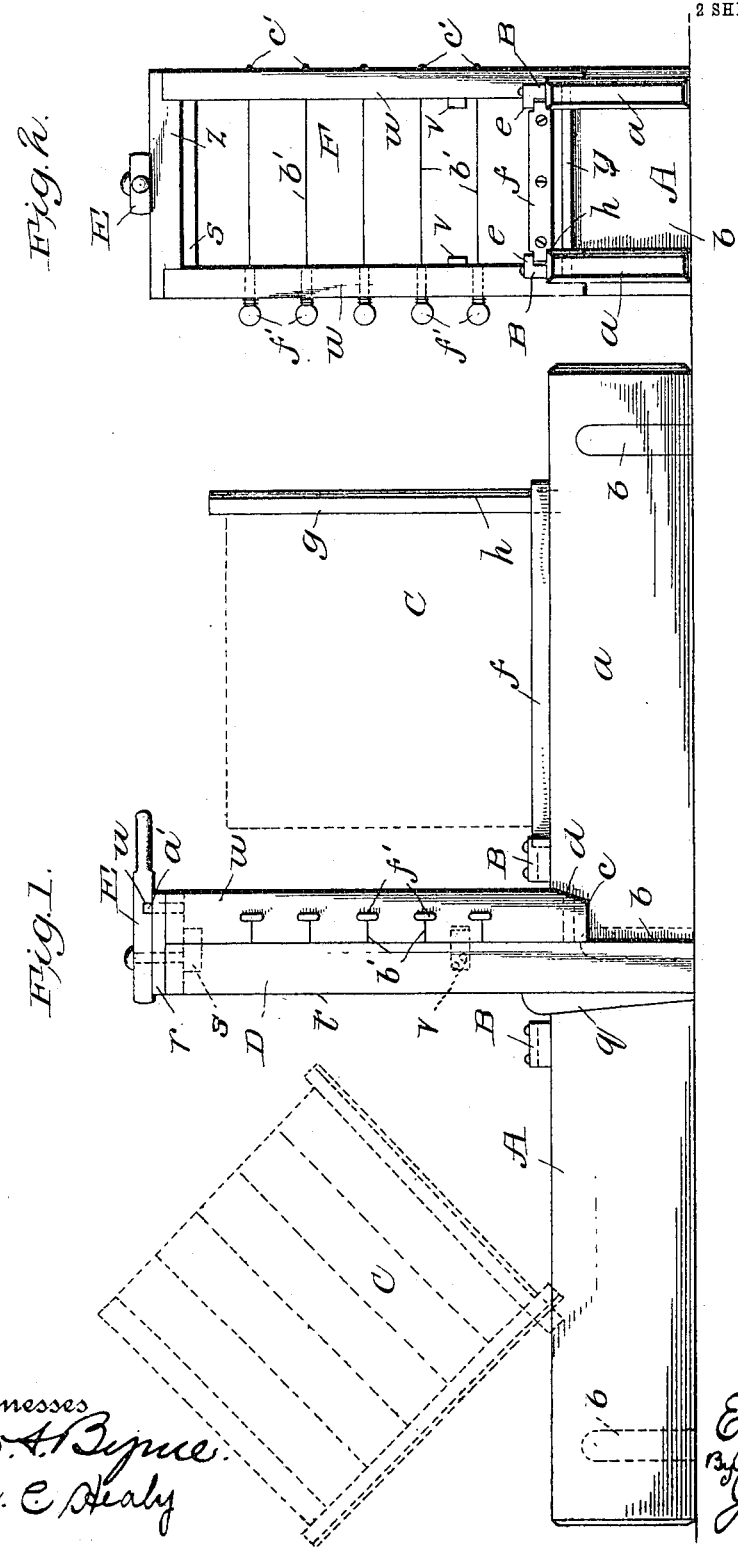

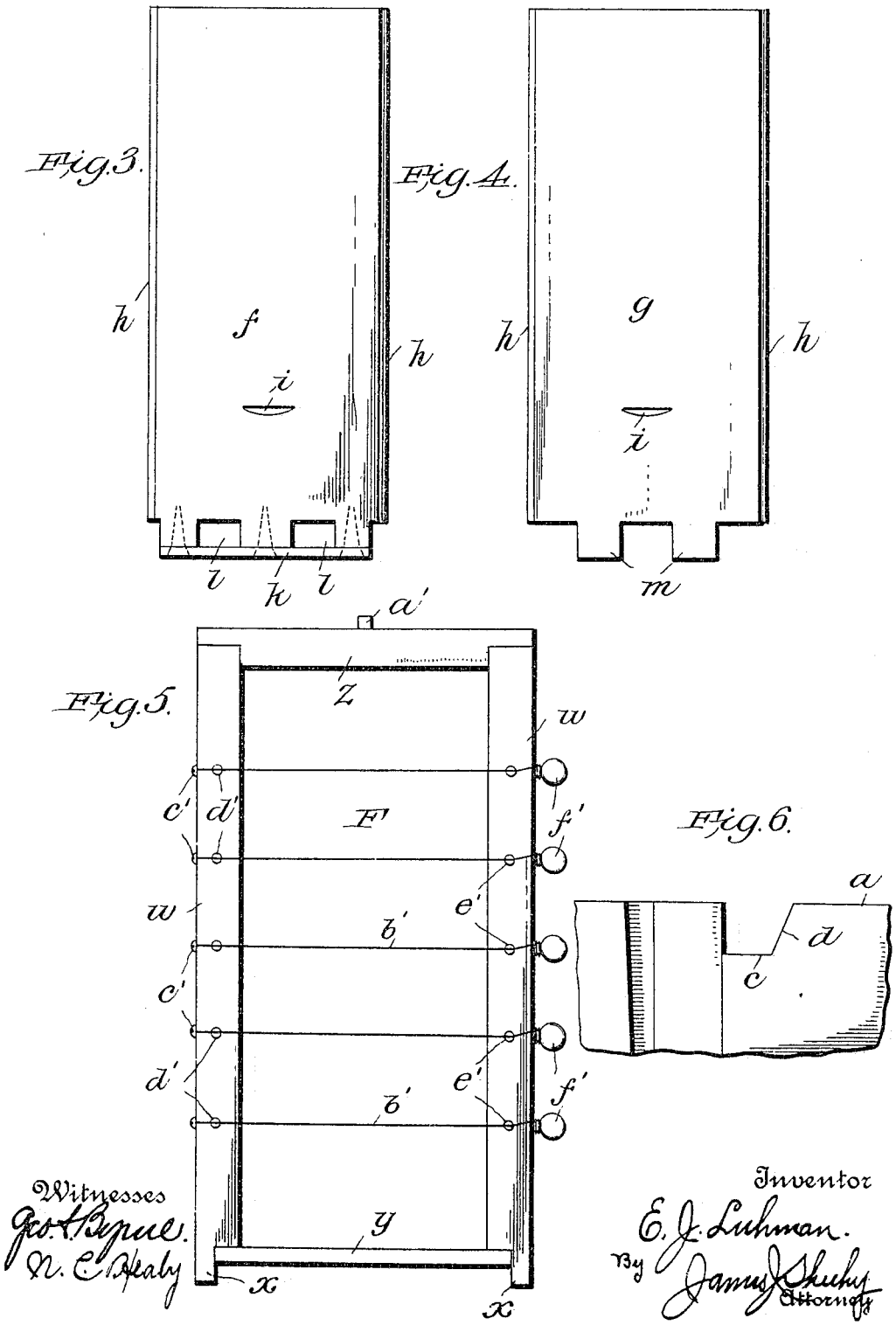

EDWARD JAMES LUHMAN, OF SAN FRANCISCO, CALIFORNIA.

MACHINE FOR CUTTING BUTTER.

No. 818,770.  Specification of Letters Patent.  Patented April 24, 1906.

Application filed February 21, 1906. Serial No. 302,234.

*To all whom it may concern:*

Be it known that I, EDWARD JAMES LUHMAN, a citizen of the United States, residing at San Francisco, in the county of San Francisco and State of California, have invented new and useful Improvements in Machines for Cutting Butter, of which the following is a specification.

My invention pertains to apparatus for cutting butter, soap, and analogous substance, and it contemplates the provision of an apparatus through the medium of which a block or mass of butter or similar substance may be expeditiously and easily cut into a plurality of small cubes.

The invention will be fully understood from the following description and claims when the same are read in connection with the accompanying drawings, forming part of this specification, in which—

Figure 1 is a side elevation illustrating the apparatus constituting the present and preferred embodiment of my invention as the same appears when ready for use. Fig. 2 is an end elevation of the machine with the upright member of the carrier removed. Figs. 3 and 4 are elevations of the two members of the carrier. Fig. 5 is an elevation illustrating the opposite side of the wire frame to that shown in Fig. 2, and Fig. 6 is a detail elevation of a portion of the main frame of the apparatus.

Similar letters designate corresponding parts in all of the views of the drawings, referring to which—

A is the main frame of the apparatus. The said main frame comprises side bars $a$ and cross-bars $b$, interposed between and fixed to the side bars, and is provided in the upper edges of the side bars at intermediate points in the length thereof with notches $c$, the outer end walls $d$ of which are inclined, as best shown in Fig. 6, for a purpose presently set forth.

B B are guides fixed to and rising from the upper edges of the frame-bars $a$. There are two guides B on each frame-bar, and the said guides are arranged about the proportional distance apart illustrated in Fig. 1 and are provided with inwardly-directed arms $e$.

C is the carrier of the apparatus—*i. e.*, the means for carrying and moving the mass or block of butter or analogous substance to be cut. The said carrier C comprises a member $f$ and a member $g$, which are detachably engaged with each other for a purpose hereinafter made clear. The member $f$ is in the form of a flat board and is provided with reduced edges $h$ and with a recess $i$, the latter being formed in the upper side of the member and being designed to facilitate lifting thereof. Said member $f$ is also provided at one end with a strip of wood $k$, which forms one wall of openings $l$, provided in the end of the wood portion of the member. The member $g$, which is preferably of wood, is provided with reduced edges $h$ and a recess $i$, like those of the member $f$, and is also provided at one end with tongues $m$, designed to be removably arranged in the openings $l$ of member $f$ after the manner shown in Fig. 1. Either of the members $f$ and $g$ may be arranged horizontally on the side bars $a$ of the main frame A, and when it is so arranged it will be apparent that the reduced edges $h$ of the member will rest under the arms $e$ of the guides B, with the result that there is no liability of casual upward movement of the member. It will also be seen that the guides B will hold the member against lateral movement, as will also the bars $a$ of the main frame A. When the members $f$ and $g$ are relatively arranged, as shown in Fig. 1, it will be apparent that a block of butter or analogous substance may be placed on the horizontal member and against the vertical member, as represented by dotted lines in said figure.

D is an upright subframe which comprises upright bars $t$, arranged at the outer sides of the frame-bars $a$ and against keys or wedges $q$ thereon, a top cross-bar $r$, connecting the upper ends of the uprights $t$, and a cross-bar $s$, connecting the uprights $t$ at a slight distance below the upper ends thereof. On the top of the said subframe is pivoted a horizontal locking-lever E, which has a notch $u$ in its under side and one edge for a purpose which will presently appear. The subframe D is provided on one or both of its upright bars $t$ with an abutment $v$, designed to serve as a stop with a view of preventing the upright member of the carrier C striking the cutting-wires of the wire frame.

F is the wire frame of the apparatus. The said frame F comprises uprights $w$, of wood or other suitable material, having their lower ends rabbeted, as indicated by $x$, so as to rest against the outer sides of the frame-bars $a$, a lower cross-bar $y$, fixed in the upper portions of the said rabbets and having its outer edge beveled to correspond with the inclined walls of the notches $d$ in the bars $a$, a rabbeted crown-bar $z$, fixed on and resting between the upper ends of the uprights $w$ and having an upwardly-extending stud $a'$, and wires $b'$, stretched between the uprights $w$ and having for their function to cut the butter, soap, or analogous substance when the said substance is forced through the wire frame F and the subframe D in the manner hereinafter set forth in detail. The cutting-wires $b'$ are connected by screws $c'$ to one upright bar $w$ and are carried over screws $d'$ on the face of said bar and are then carried across the space between the two bars $w$ and over screws $e'$ on the bar opposite to that first mentioned and are connected to keys $f'$ on the second-mentioned bar, which keys have for their purpose to tighten the wires and maintain the same in a taut state.

The operation of my novel apparatus will be fully understood from the following description. The frame F, having wires $b'$ at the desired distance apart, is placed on the main frame A in the manner shown in Fig. 1—i. e., so that its cross-bar $y$ rests in the notches $c$ and its crown-bar $z$ rests on the cross-bar $s$ of the subframe D—and is secured in position by swinging the locking-lever E, so that the notch $u$ therein receives the stud $a'$. The members $f$ and $g$ of the carrier C are then engaged one with the other and are placed on the bars $a$ of the main frame A, as shown at the right of Fig. 1, after which the block or mass of butter to be cut is placed on the horizontal member and against the vertical member. With this done the carrier C is moved toward the left until the upright member thereof brings up against the stop $v$, when, as will be readily apparent, the wires $b'$ will have cut through the mass of butter to a point adjacent to the upright member of the carrier C. The upright member of the carrier is then disconnected from the horizontal carrier, and the horizontal carrier is then moved farther to the left until the mass of butter is entirely at the left of the wire frame F and the subframe D. The upright member of the carrier C is now reëngaged with the horizontal member, and the carrier, with the block or mass of butter thereon, is rocked toward the right, so as to make the original upright member of the carrier the horizontal member and the original horizontal member the upright member. The carrier with the block of butter still thereon is then moved toward the right until the wires $b'$ cut through the butter at right angles to the first-mentioned cuts, when, as will be readily apparent, the butter will be reduced to cubes corresponding in size to the distance between the wires $b'$.

For the purpose of making the operation described in the foregoing more clear I have shown by dotted lines at the left of Fig. 1 the manner in which the carrier C and the block of butter thereon are rocked to change the position of the mass of butter relative to the wires $b'$.

It will be gathered from the foregoing that by operating my apparatus in the manner described a mass of butter may be quickly and easily reduced to comparatively small cubes, and it will also be gathered that my apparatus is simple and inexpensive, is susceptible of being readily cleaned and kept clean, and embodies no delicate parts, such as are liable to get out of order after a short period of use.

I have specifically described the construction and relative arrangement of the parts embraced in the preferred embodiment of my invention in order to impart a definite understanding of the said embodiment. I do not desire, however, to be understood as confining myself to the said specific construction and relative arrangement of parts, as such changes or modifications may be made in practice as fairly fall within the scope of my invention as claimed.

Having described my invention, what I claim, and desire to secure by Letters Patent, is—

1. In an apparatus for cutting butter and analogous substance, the combination with a plurality of cutters spaced apart; of a carrier movable with respect to the plurality of cutters and comprising members detachably connected together.

2. In an apparatus for cutting butter and analogous substance, the combination of a cutter, and a carrier movable with respect to the cutter and having members one of which is movable past the cutter and the other of which is adapted to be positioned so as to pass the cutter and be then restored to its original position relative to the first-mentioned member.

3. In an apparatus for cutting butter and analogous substance, the combination with one or more cutters; of a carrier movable with respect to the cutter or cutters, the said carrier being arranged to rock, and being made up of members detachably connected together.

4. In an apparatus for cutting butter and analogous substance, the combination with one or more cutters; of a carrier movable with respect to the cutter or cutters, the said carrier being arranged to rock or turn toward the cutter or cutters and being made up of a member having a socket adjacent to one end, and a member having a tongue at one end removably arranged in the socket of the first-mentioned member.

5. In an apparatus for cutting butter and analogous substance, the combination with a main frame, and a plurality of cutting-wires arranged transversely above the main frame; of a carrier movable on the main frame and adapted to be turned thereon, said carrier comprising members detachably connected to each other and arranged to rest against different sides of a mass of butter or the like.

6. In an apparatus for cutting butter and analogous substance, the combination of a main frame, a subframe rising from the main frame and provided with a fastening device, a wire frame removably arranged on the main frame and against the subframe and having an appurtenance for the engagement of the said fastening device, and a carrier movable on the main frame and adapted to rock and comprising a horizontal member and an upright member detachably engaged with the horizontal member.

7. A carrier for the purpose described, comprising members provided with coöperating means whereby they are detachably held together at right angles to each other.

8. In an apparatus for cutting butter and analogous substance, the combination with a main frame having side bars provided in their upper edges with notches the outer walls of which are inclined, and a subframe rising from the main frame and provided with a fastening device; of a wire frame comprising uprights having lower rabbeted ends, a cross-bar arranged in the rabbets of said ends and having an edge inclined in conformity with the inclined walls of the notches, a crown-bar bearing an appurtenance for engaging with the fastening device, and wires stretched between the uprights.

In testimony whereof I have hereunto set my hand in presence of two subscribing witnesses.

EDWARD JAMES LUHMAN.

Witnesses:
 A. D. DUNLEAVY,
 GEORGE F. BRUNS.